United States Patent
Kulkarni et al.

(10) Patent No.: US 11,939,884 B2
(45) Date of Patent: Mar. 26, 2024

(54) SYSTEM AND METHOD FOR REPAIRING HIGH-TEMPERATURE GAS TURBINE BLADES

(71) Applicant: Siemens Energy, Inc., Orlando, FL (US)

(72) Inventors: Anand A. Kulkarni, Charlotte, NC (US); Kazim Ozbaysal, Charlotte, NC (US); Ahmed Kamel, Orlando, FL (US); Kyle I. Stoodt, Charlotte, NC (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 17/627,779

(22) PCT Filed: Nov. 13, 2019

(86) PCT No.: PCT/US2019/061204
§ 371 (c)(1),
(2) Date: Jan. 17, 2022

(87) PCT Pub. No.: WO2021/021232
PCT Pub. Date: Feb. 4, 2021

(65) Prior Publication Data
US 2022/0212296 A1    Jul. 7, 2022

Related U.S. Application Data

(60) Provisional application No. 62/880,949, filed on Jul. 31, 2019, provisional application No. 62/880,387, filed on Jul. 30, 2019.

(51) Int. Cl.
*F01D 5/28*    (2006.01)
*B22F 1/10*    (2022.01)
(Continued)

(52) U.S. Cl.
CPC .......... *F01D 5/28* (2013.01); *B22F 1/10* (2022.01); *B22F 3/1021* (2013.01); *B22F 3/26* (2013.01);
(Continued)

(58) Field of Classification Search
CPC .......... B23P 6/005; Y10T 29/49318; Y10T 29/49737; Y10T 29/49734; Y10T 29/49732; B23K 1/001
See application file for complete search history.

(56) References Cited

U.S. PATENT DOCUMENTS 4,305,697 A * 12/1981 Cohen .................... F01D 5/005
                                            29/402.13
4,326,833 A *  4/1982 Zelahy ................... F01D 5/005
                                            29/402.13
(Continued)

FOREIGN PATENT DOCUMENTS

CN    1791508 A    6/2006
CN    1896464 A    1/2007
(Continued)

OTHER PUBLICATIONS

PCT International Search Report and Written Opinion of International Searching Authority dated Feb. 26, 2020 corresponding to PCT International Application No. PCT/US2019/061204 filed Nov. 13, 2019.
(Continued)

*Primary Examiner* — Jason L Vaughan

(57) ABSTRACT

A blade for a gas turbine includes a removed portion space, and further includes an airfoil portion defining the removed portion space, the airfoil portion formed from a base material, and a replacement component formed to fill the removed portion space. The replacement component is formed from a material that includes 50%-80% base material, 0%-30% braze material, and 0%-8% aluminum. A braze (Continued)

joint is formed between the airfoil portion and the replacement component to attach the replacement component to the airfoil portion and fill the removed portion space.

9 Claims, 11 Drawing Sheets

(51) Int. Cl.
| | |
|---|---|
| B22F 3/10 | (2006.01) |
| B22F 3/26 | (2006.01) |
| B22F 5/04 | (2006.01) |
| B22F 10/16 | (2021.01) |
| B22F 10/18 | (2021.01) |
| B22F 10/38 | (2021.01) |
| B22F 10/40 | (2021.01) |
| B22F 10/68 | (2021.01) |
| B23K 1/00 | (2006.01) |
| B23K 35/30 | (2006.01) |
| B23K 101/00 | (2006.01) |
| B23P 6/00 | (2006.01) |
| C22C 19/05 | (2006.01) |
| F01D 5/00 | (2006.01) |
| F01D 25/00 | (2006.01) |

(52) U.S. Cl.
CPC ............... *B22F 5/04* (2013.01); *B22F 10/16* (2021.01); *B22F 10/18* (2021.01); *B22F 10/38* (2021.01); *B23K 1/0018* (2013.01); *B23K 35/3033* (2013.01); *B23P 6/005* (2013.01); *C22C 19/058* (2013.01); *F01D 5/005* (2013.01); *F01D 25/005* (2013.01); B22F 10/40 (2021.01); B22F 10/68 (2021.01); B22F 2301/15 (2013.01); B23K 2101/001 (2018.08); F05D 2230/237 (2013.01); F05D 2230/64 (2013.01); F05D 2230/80 (2013.01)

(56) References Cited

U.S. PATENT DOCUMENTS

| | | | |
|---|---|---|---|
| 5,269,057 A * | 12/1993 | Mendham | F01D 5/005 |
| | | | 29/402.13 |
| 5,794,338 A | 8/1998 | Bowden, Jr. et al. | |
| 6,520,401 B1 | 2/2003 | Miglietti et al. | |
| 6,575,349 B2 * | 6/2003 | Van Esch | C23C 4/073 |
| | | | 228/119 |
| 6,575,702 B2 * | 6/2003 | Jackson | B23P 15/04 |
| | | | 29/402.13 |
| 7,484,928 B2 * | 2/2009 | Arness | B23P 6/005 |
| | | | 415/115 |
| 7,789,288 B1 | 9/2010 | Johnson et al. | |
| 7,810,237 B2 * | 10/2010 | Lange | F01D 5/005 |
| | | | 29/402.09 |
| 8,640,942 B1 | 2/2014 | Ozbaysal et al. | |
| 9,416,667 B2 * | 8/2016 | Cui | F01D 5/005 |
| 9,440,287 B2 | 9/2016 | Bruck et al. | |
| 9,765,623 B2 * | 9/2017 | Kottilingam | F01D 5/20 |
| 9,863,249 B2 * | 1/2018 | Shinn | F01D 5/005 |
| 9,926,785 B2 * | 3/2018 | Stankowski | F01D 5/005 |
| 10,315,264 B2 * | 6/2019 | Cui | B23K 28/02 |
| 10,443,399 B2 * | 10/2019 | Jones | F01D 5/187 |
| 10,450,868 B2 * | 10/2019 | Jones | F01D 5/145 |
| 10,502,063 B2 * | 12/2019 | Weaver | F01D 5/20 |
| 10,519,777 B2 * | 12/2019 | Packer | B23K 11/002 |
| 10,766,105 B2 * | 9/2020 | Henderkott | B23K 1/20 |
| 10,875,128 B2 * | 12/2020 | Xu | B23K 35/304 |
| 11,090,770 B2 * | 8/2021 | Srinivasan | B22F 10/28 |
| 11,143,033 B2 * | 10/2021 | Kottilingam | F01D 5/147 |
| 11,203,938 B2 * | 12/2021 | Kottilingam | F01D 9/065 |
| 11,305,363 B2 * | 4/2022 | Xu | B23K 1/0018 |
| 11,333,031 B2 * | 5/2022 | Patel | F01D 11/12 |
| 11,338,396 B2 * | 5/2022 | Bulgrin | B23K 1/008 |
| 11,655,717 B2 * | 5/2023 | Henderkott | F01D 5/20 |
| | | | 228/245 |
| 2001/0025417 A1 | 10/2001 | Fried et al. | |
| 2004/0229069 A1 | 11/2004 | Sandin | |
| 2005/0152805 A1 | 7/2005 | Arnold et al. | |
| 2005/0274009 A1 | 12/2005 | Powers et al. | |
| 2006/0067830 A1 | 3/2006 | Guo et al. | |
| 2006/0134454 A1 | 6/2006 | Sathian et al. | |
| 2006/0277753 A1 * | 12/2006 | Ntsama-Etoundi | F01D 5/005 |
| | | | 29/402.09 |
| 2007/0039177 A1 | 2/2007 | Yoshioka et al. | |
| 2007/0099011 A1 | 5/2007 | Wilson | |
| 2007/0102483 A1 | 5/2007 | Pietruska et al. | |
| 2007/0175546 A1 | 8/2007 | Hoppe et al. | |
| 2010/0038412 A1 | 2/2010 | Huang | |
| 2011/0076151 A1 | 3/2011 | Cui et al. | |
| 2011/0099810 A1 * | 5/2011 | Stankowski | F01D 5/005 |
| | | | 29/888 |
| 2011/0180199 A1 * | 7/2011 | Huxol | B23K 35/0244 |
| | | | 419/68 |
| 2013/0020377 A1 | 1/2013 | Stankowski et al. | |
| 2013/0112737 A1 | 5/2013 | Clement et al. | |
| 2013/0115091 A1 | 5/2013 | Bruck et al. | |
| 2014/0093415 A1 | 4/2014 | James et al. | |
| 2014/0220376 A1 | 8/2014 | Schick et al. | |
| 2014/0241900 A1 | 8/2014 | Roberts et al. | |
| 2014/0255194 A1 * | 9/2014 | Jones | F01D 5/225 |
| | | | 29/889.7 |
| 2015/0125281 A1 | 5/2015 | Georgieva et al. | |
| 2015/0290747 A1 | 10/2015 | Ozbaysal et al. | |
| 2015/0343574 A1 | 12/2015 | Ozbaysal | |
| 2015/0367456 A1 | 12/2015 | Ozbaysal et al. | |
| 2016/0199930 A1 * | 7/2016 | Yarbrough | B23P 6/005 |
| | | | 228/119 |
| 2017/0197283 A1 * | 7/2017 | Perez | C22C 19/056 |
| 2017/0368647 A1 * | 12/2017 | Bunker | B23P 6/045 |
| 2017/0370222 A1 | 12/2017 | Bunker | |
| 2018/0305266 A1 | 10/2018 | Gibson et al. | |
| 2018/0345396 A1 | 12/2018 | Kottilingam et al. | |
| 2019/0337073 A1 | 11/2019 | Ozbaysal | |
| 2022/0212296 A1 | 7/2022 | Kulkarni et al. | |

FOREIGN PATENT DOCUMENTS

| | | |
|---|---|---|
| CN | 1954960 A | 5/2007 |
| CN | 101987385 A | 3/2011 |
| CN | 102029449 A | 4/2011 |
| CN | 102887727 A | 1/2013 |
| CN | 103052466 A | 4/2013 |
| CN | 103889648 A | 6/2014 |
| CN | 103962670 A | 8/2014 |
| CN | 105102181 A | 11/2015 |
| EP | 1759799 A2 | 3/2007 |
| FR | 2981590 A1 | 4/2013 |
| JP | H07215781 A | 8/1995 |
| JP | H09286677 A | 11/1997 |
| JP | H10339103 A | 12/1998 |
| JP | 2007518877 A | 7/2007 |
| RU | 2240214 C1 | 11/2004 |
| RU | 2703666 C2 | 10/2019 |
| WO | 2018217213 A1 | 11/2018 |

OTHER PUBLICATIONS

Lin Liheng, Diao Xiaogang, Luo Haibo / Research Status and Development Trend of Dissimilar Materials Brazing at Home and Abroad ; Welding Technology, vol. 45, No. 8 ; Aug. 28, 2016.
Sun Yuan, Liu Jide, Liu Zhongming, Yang Jinxia, Li Jinguo, Jin Tao, Sun Xiaofeng / Microstructure Evolution and Mechanical Properties of DD5 Single Crystal Superalloy Joint Brazed by Co-Based Filler Alloy; Acta Metallurgica Sinica, 12 ; Dec. 11, 2013.
Li Ju et al "Study on powder metallurgy repair technology for K417G alloy" Jan. 25, 2018.

(56) References Cited

OTHER PUBLICATIONS

Zhang Jie et al "An Advanced Powder Metallurgy Remanufactures Technique for GT" Oct. 3, 2010.

* cited by examiner

SYSTEM AND METHOD FOR REPAIRING HIGH-TEMPERATURE GAS TURBINE BLADES

TECHNICAL FIELD

The present disclosure is directed, in general, to a system and method for repairing high-temperature gas turbine components, and more specifically to such a system and method for the repair of gas turbine blades and vanes.

BACKGROUND

The difficulties associated with the additive manufacture (AM) of nickel-base gas turbine components with high gamma prime content makes the process unsuitable for large scale manufacturing or repair. In particular, attempts to additively manufacture components using Alloy (CM) 247, or to repair such components often result in grain boundary melting and cracking. Alternatively, the components are repaired with another inferior nickel base alloy that is less prone to cracking, resulting in poor performance of the component.

SUMMARY

A blade for a gas turbine includes a removed portion space, and further includes an airfoil portion defining the removed portion space, the airfoil portion formed from a base material, and a replacement component formed to fill the removed portion space. The replacement component is formed from a material that includes 50%-80% base material, 0%-30% braze material, and 0%-8% aluminum. A braze joint is formed between the airfoil portion and the replacement component to attach the replacement component to the airfoil portion and fill the removed portion space.

In another construction, a method of repairing a blade for a gas turbine formed from a nickel-based superalloy includes removing a portion of an airfoil portion of the blade to define a removed portion space, forming a replacement component sized to fill the removed portion space, the replacement component formed from a material that includes, greater than 50% base material that matches a material used to form the airfoil portion of the blade, and up to 8% aluminum. The method further includes brazing the replacement component to the airfoil portion using a braze material, the brazing step maintaining the temperature of the airfoil portion and the replacement component below a grain boundary melting temperature of the base material.

In another construction, a method of repairing a blade for a gas turbine formed from a nickel-based superalloy includes removing a portion of an airfoil portion of the blade to define a removed portion space, preparing a powdered metal and binder mixture, and forming a green-form component using the mixture. The method further includes heating the green-form component to burn out the binder, the powdered metal forming mechanical or metallurgical bonds to maintain the shape of the green-form component and sintering the green-form component to produce a replacement component having a density of at least 96 percent. In addition, the method includes positioning the replacement component in the removed portion space, the replacement component filling the removed portion space, and brazing the replacement component to the airfoil portion using a braze material, the brazing step maintaining the temperature of the airfoil portion and the replacement component below a grain boundary melting temperature of the base material.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
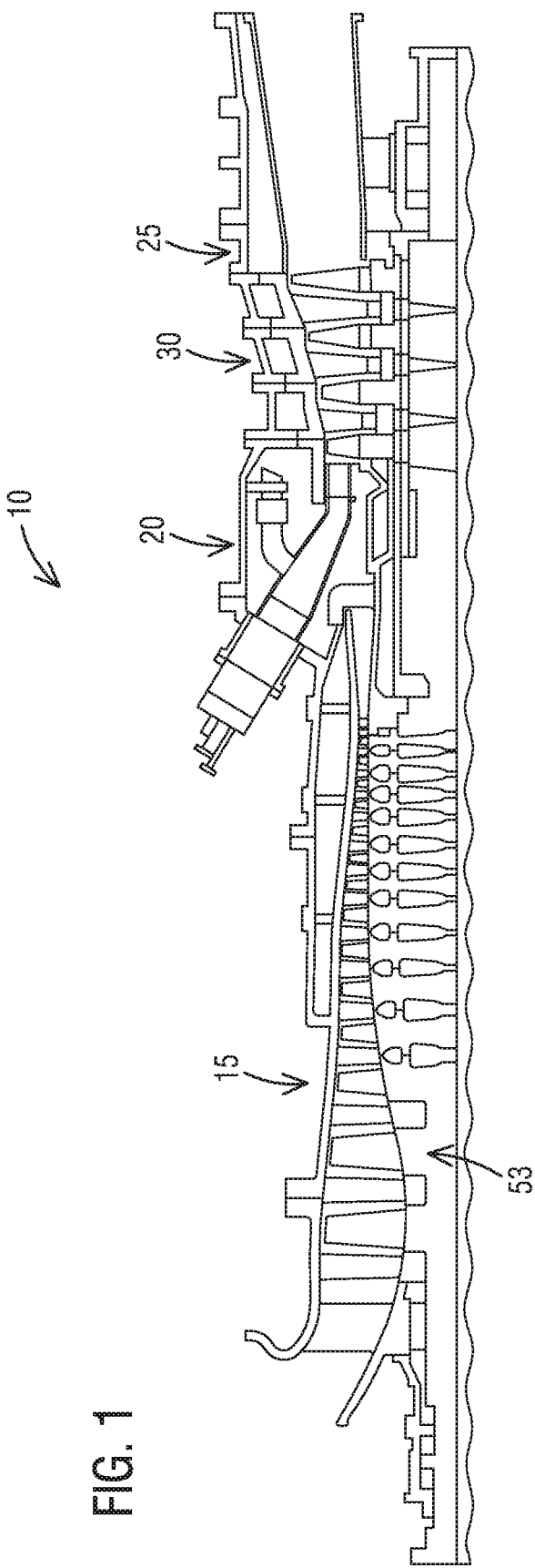
FIG. 1 is a longitudinal section view of a gas turbine engine.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

FIG. 1 illustrates a gas turbine or combustion turbine engine 10 that includes a compressor section 15, a combustion section 20, and a turbine section 25. During operation, atmospheric air is drawn into the compressor section 15 and compressed. A portion of the compressed air is mixed with a fuel and combusted in the combustion section 20 to produce high-temperature products of combustion. The products of combustion are mixed with the remaining compressed air to form exhaust gas that then passes through the turbine section 25. The exhaust gas expands within the turbine section 25 to produce torque that powers the compressor section 20 and any auxiliary equipment attached to the engine 10, such as an electrical generator. The exhaust gas enters the turbine section 25 at a high temperature (1000 degrees F., 538 degrees C. or greater), such that the turbine blades 30 and vanes are exposed to high temperatures and must be manufactured from materials suited to those temperatures. The terms "blade" and "vane" should be read as being interchangeable. While typically, the term "blade" refers to rotating air foils and "vane" refers to stationary airfoils, the invention should not be limited to these definitions as most repairs or processes are equally applicable to both blades and vanes.

Figure 2:
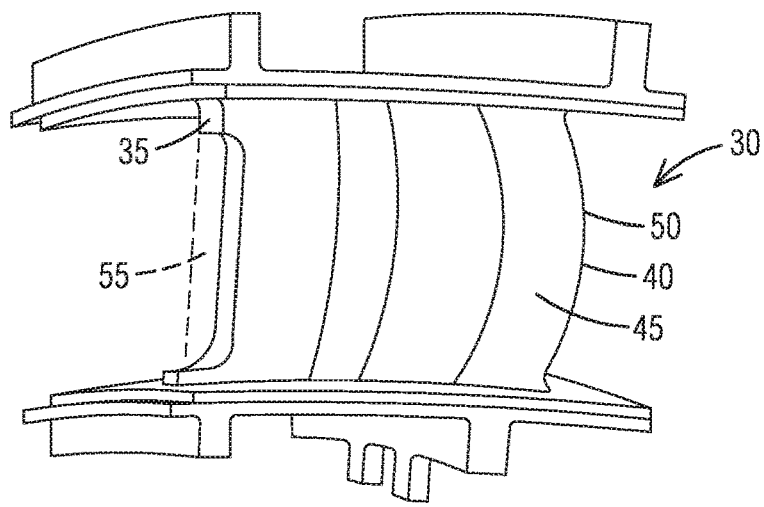
FIG. 2 is a perspective view of several vanes of the gas turbine engine of FIG. 1.

In one construction, the vanes 30 are manufactured from a nickel-based superalloy such as Alloy (CM) 247. FIG. 2 illustrates a portion of the stationary vanes 30 from the turbine section 25 of the engine 10 of FIG. 1. Each vane 30 includes a leading edge 35, a trailing edge 40, a suction side 45, and a pressure side 50. Adjacent vanes 30 cooperate with one another to define a flow path therebetween. The exhaust gas passes through the flow paths and is directed and accelerated as desired to provide an efficient expansion of the exhaust gas and to provide torque to a rotor 53 that in turn drives the auxiliary equipment.

During operation, the vanes 30 can become damaged. Damage can be caused by foreign object impacts, high temperature operation, fatigue, creep, oxidation, and the like. One area that is susceptible to damage is the leading edge 35 of the vane 30. FIG. 2 illustrates one of the vanes 30 with a portion 55 of the leading edge 35 removed. A desired repair would include replacing the removed portion 55 with a material that closely matches the base material. However, nickel-based superalloys such as those used to manufacture the vanes 30 are not conducive to welding or typical additive manufacturing repair processes.

Figure 3:
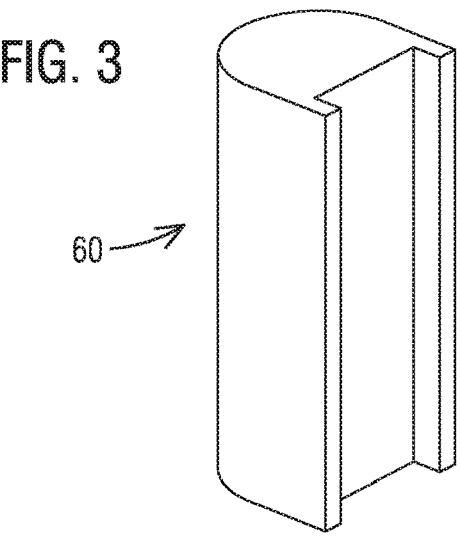
FIG. 3 is a perspective view an insert piece for use in repairing a turbine vane of FIG. 2.
Figure 4:
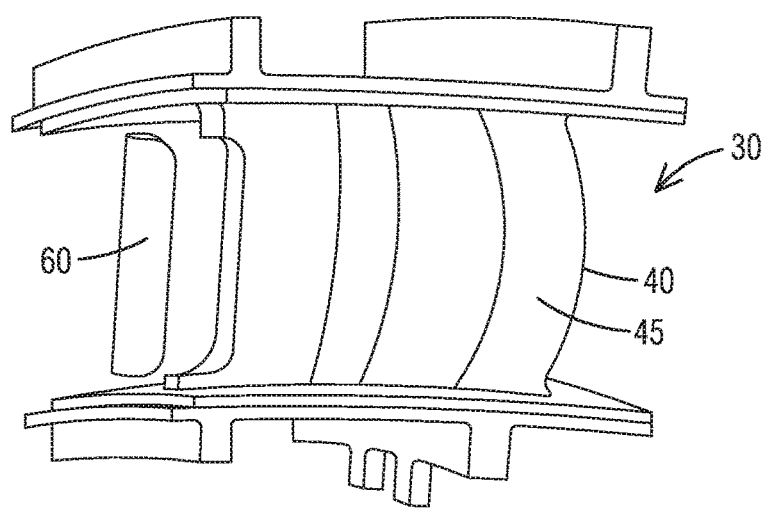
FIG. 4 is a perspective view of the vanes of FIG. 2 with the insert piece of FIG. 3 being installed.

FIGS. 3 and 4 illustrate one possible repair for the leading edge 35 of the vane 30 illustrated in FIG. 2. FIG. 3 illustrates an insert piece in the form of a leading edge insert 60 and FIG. 4 illustrates the positioning of the leading edge insert 60 in the vane 30 for attachment. The insert 60 includes a substantial portion of matching base material and is typically attached using a brazing process.

FIGS. 5-12 illustrate a process for manufacturing the insert piece 60 illustrated in FIG. 3 or any other repair component desired. FIGS. 5-8 illustrate the process for a generic cube-shaped object 65 while FIGS. 9-12 illustrate a similar process for the leading edge insert 60 illustrated in FIG. 3.

Figure 5:
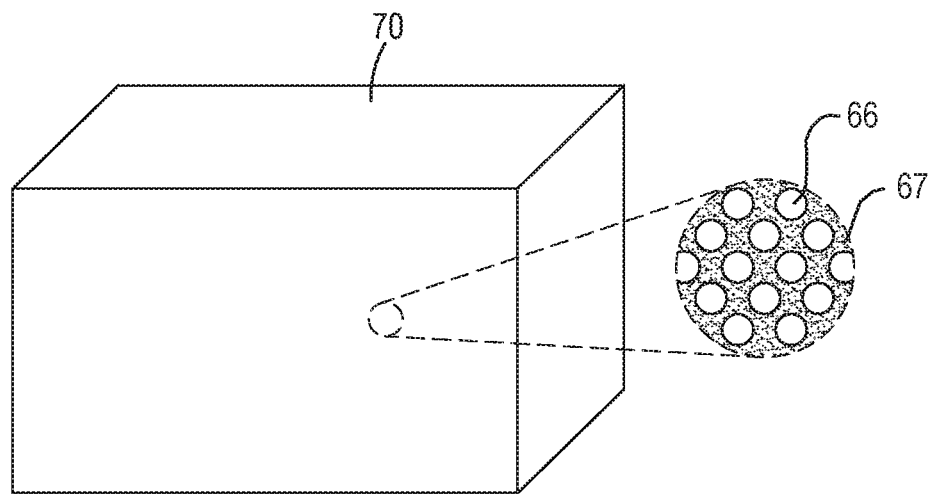
FIG. 5 is a perspective view of a component 3D printed to a near net shape.
Figure 9:
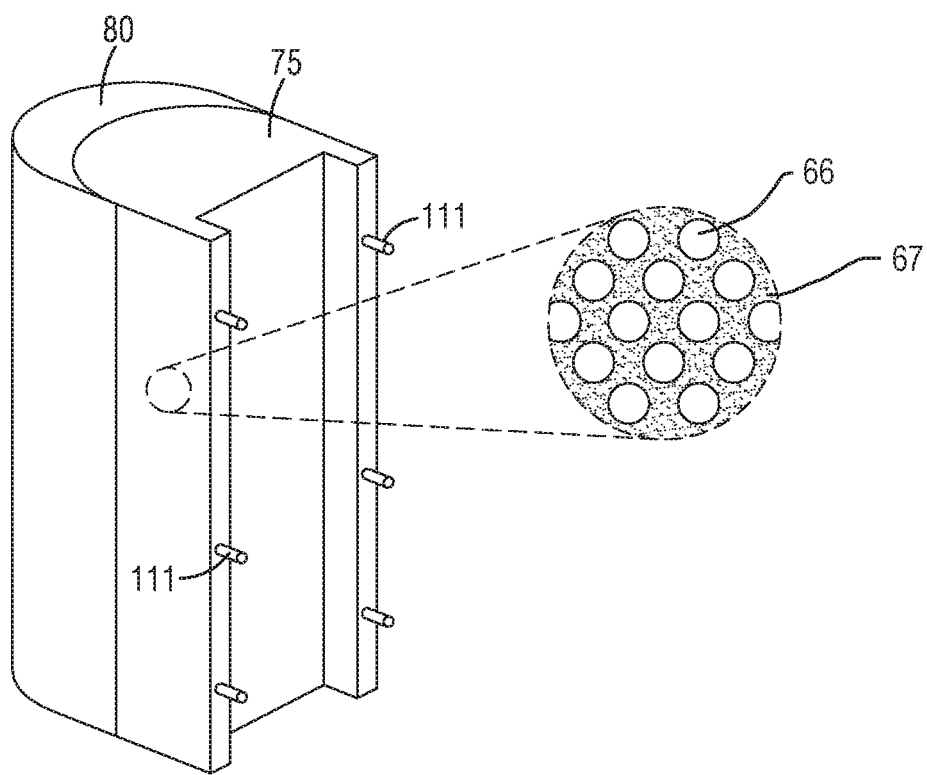
FIG. 9 is a perspective view of another component 3D printed to a near net shape.

The process begins by mixing a high gamma prime nickel powder 66 (base material) with a binder 67 and 3D printing or otherwise additively manufacturing a green form of the desired component 70, 75 to a near net shape. The green form component 70, 75 is then allowed to dry. FIGS. 5 and 9 illustrate this step. During the printing or additive manufacturing process, the base material is not melted. As used herein, the term "near net shape" means that the component falls within the desired manufacturing parameters and tolerances for the component at a particular step in the manufacturing process without further machining. However, some surface grinding or polishing may be required to achieve a desired surface finish or texture for the final component. In addition, additional layers or coatings may be applied to the component to complete the component for use. Furthermore, and as illustrated in FIGS. 9-12 the green form component 75 may include features such as gates 80, or support structures that are used during the manufacturing process and then removed. The green form component 75, including features such as these would be considered near net shape as additional machining or processing is not required before the additional manufacturing steps are performed and all that is required is the removal of the unwanted features (gate 80).

Figure 6:
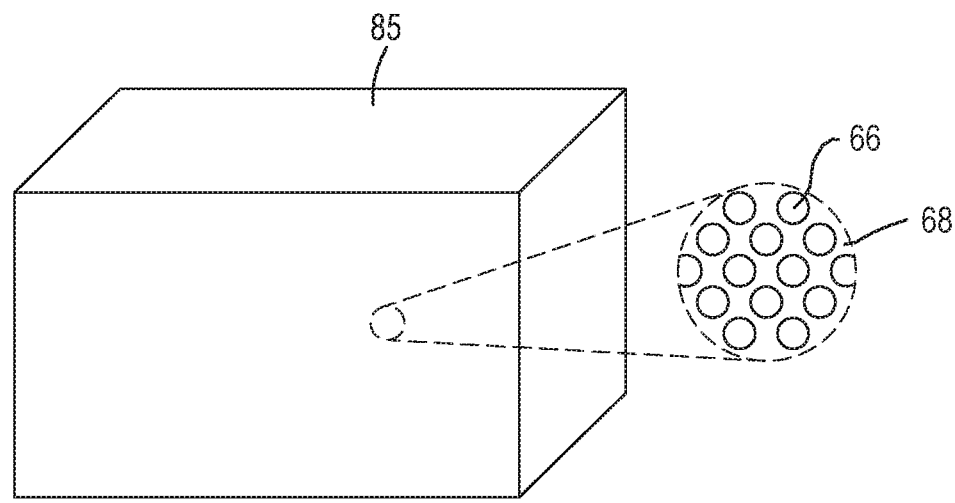
FIG. 6 is a perspective view of the component skeleton after removal of a binder and sintering.
Figure 10:
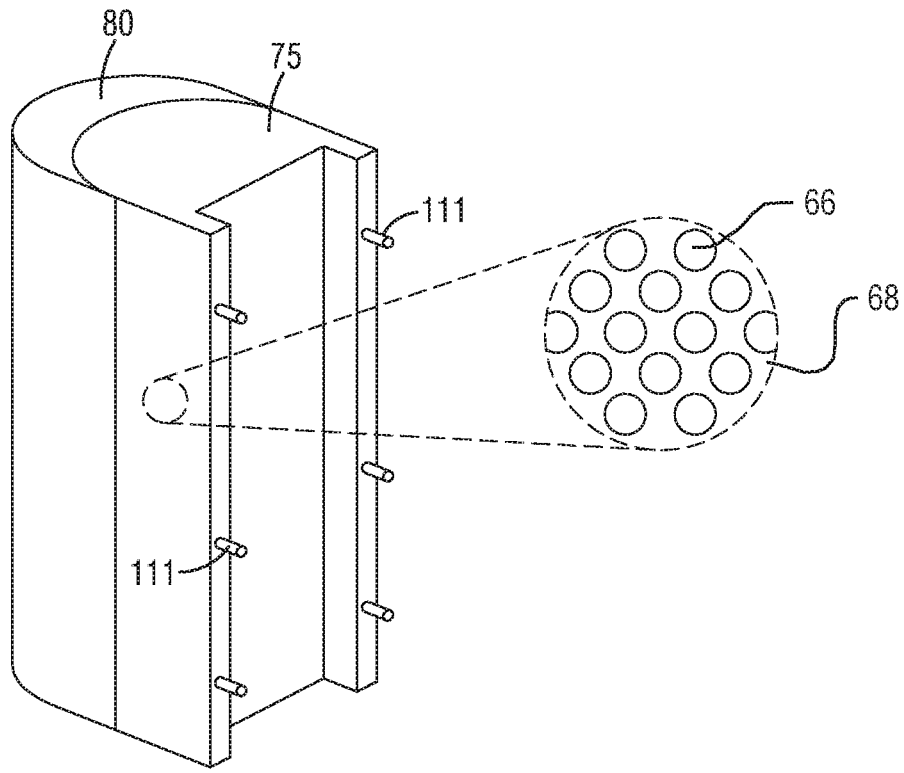
FIG. 10 is a perspective view of the component skeleton of FIG. 9 after removal of a binder and sintering.

The next step is the placement of the green form component 70, 75 into a furnace or other heating device. The green form component 70, 75 is heated to burn or remove the binder 67. The remaining material defines a skeleton 85, 90 made up of the base material 66 and gaps or empty areas 68 formerly occupied by the binder material 67. In FIG. 6, the skeleton 85 is a cube-shape. In FIG. 10 the skeleton 90 defines an intermediate component that will ultimately become the leading edge insert 60 and further includes the gate 80. In preferred arrangements, the heating or sintering step does not melt the base material 66 and leaves at least eighty percent of the volume of the skeleton 85, 90 as base material 66, thereby leaving no more than twenty percent of the skeleton 85, 90 as empty space 68. This is referred to herein as twenty percent porosity or less. The amount of binder 67 used, and the sintering temperature are selected to arrive at less than twenty percent porosity and preferably between five percent and twenty percent porosity.

Figure 7:
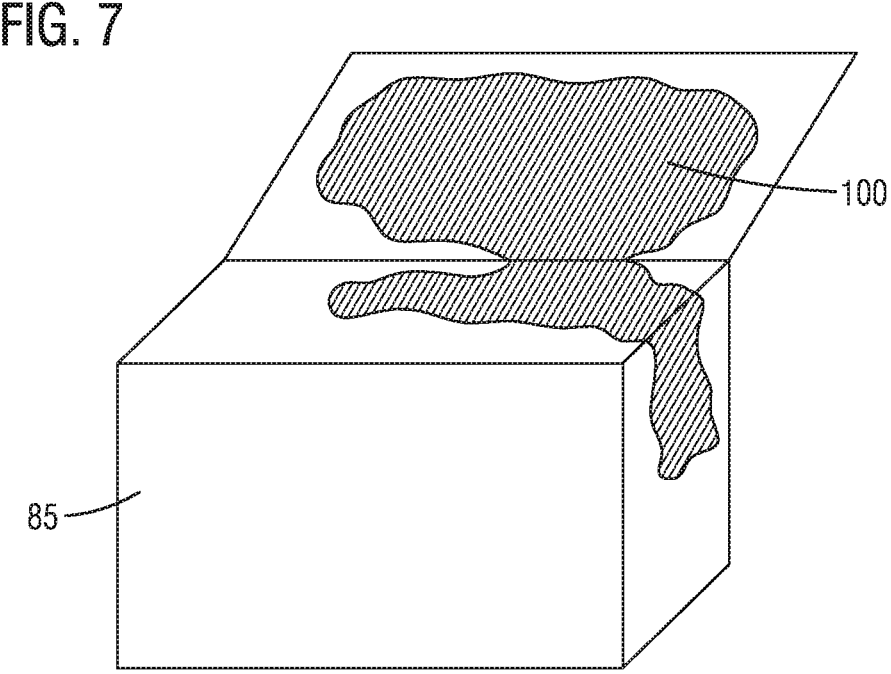
FIG. 7 is a perspective view of the component skeleton during an infiltration of a melting point depressant.
Figure 8:
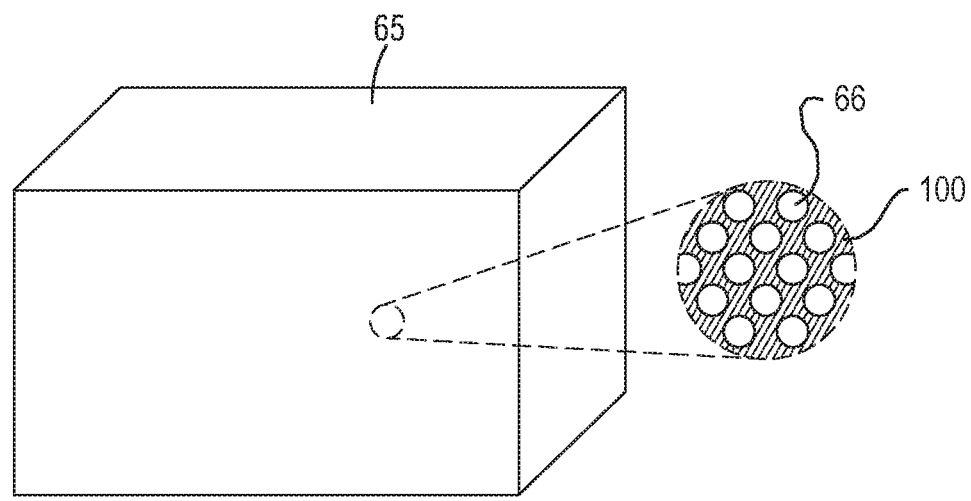
FIG. 8 is a perspective view of the completed near net shape component following infiltration.
Figure 11:
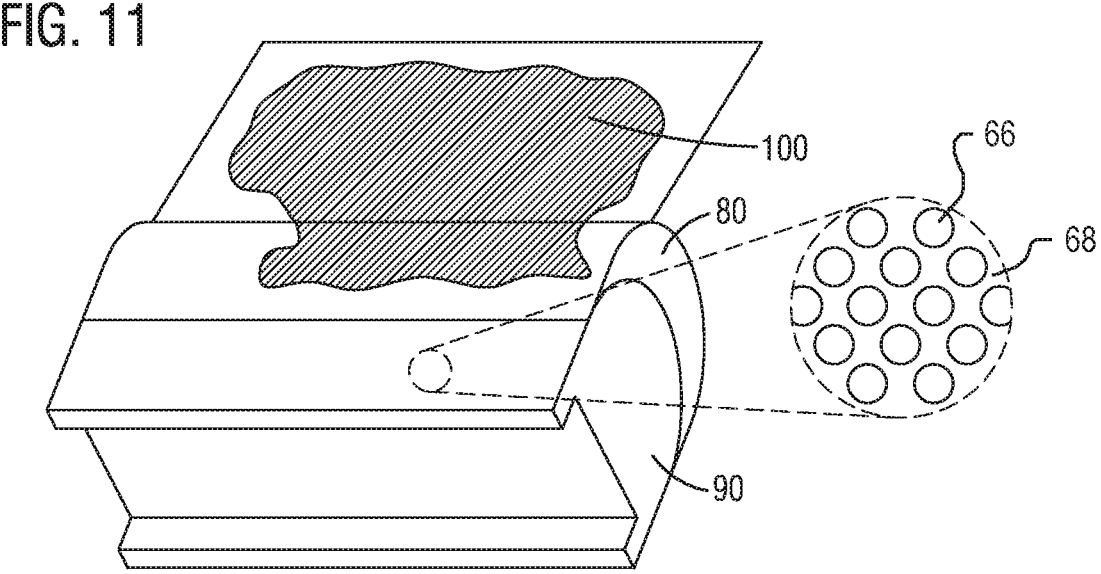
FIG. 11 is a perspective view of the component skeleton of FIG. 9 during an infiltration of a melting point depressant.
Figure 12:
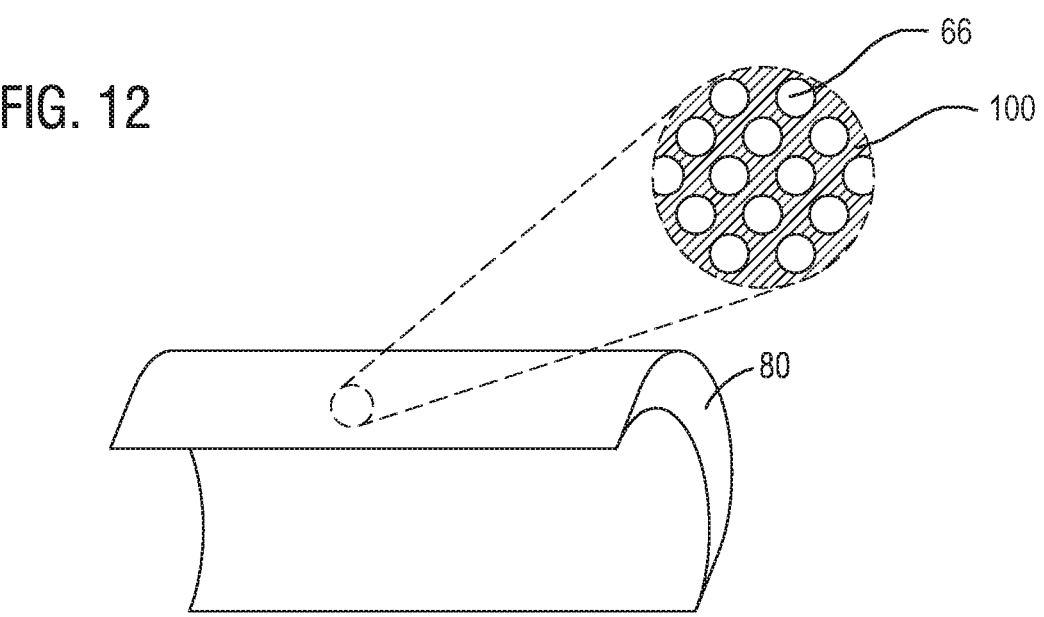
FIG. 12 is a perspective view of the completed near net shape component following infiltration and during removal of a gate.
Figure 12:
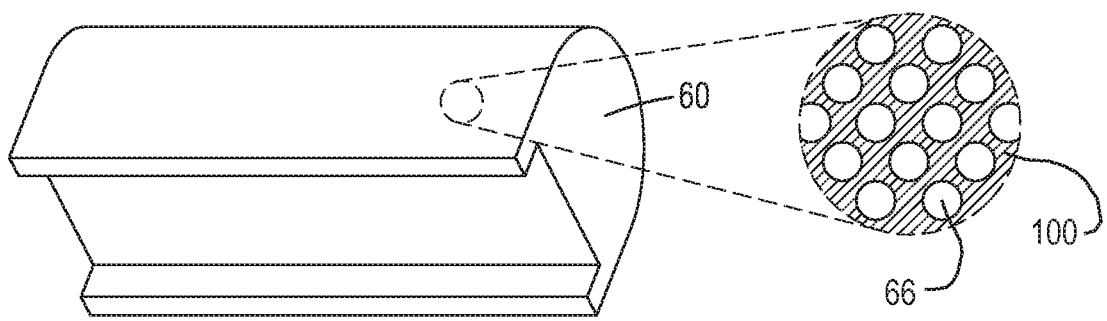

As illustrated in FIGS. 7 and 11, the skeleton 85, 90 and the gate 80 are infiltrated with low melting point material, or melting point depressant 100 (sometimes referred to as braze material). Preferred compositions of the melting point depressant 100 include at least one of titanium (Ti), zirconium (Zr), and hafnium (Hf) with the balance being chromium (Cr) and nickel (Ni). The use of boron (B), silicon (Si), or phosphorous (P) in part or in whole as the melting point depressant 100 is avoided to prevent the negative effects these materials have on the material properties of the completed component 60, 65.

To produce the desired infiltration, the melting point depressant 100 is melted in a manner that assures that the liquid melting point depressant 100 is in contact with the skeleton 85, 90. Capillary action produced by the porosity in the skeleton 85, 90 pulls the liquid melting point depressant 100 into the pores 68 of the skeleton 85, 90 and can result in a completed component 60, 65 that is ninety-nine percent filled with material (i.e., one percent porosity).

The specific composition of the melting point depressant 100 is selected based at least in part on the quantity of titanium included in the base material. For example, in constructions that include 3.5 percent or more titanium by weight in the base material, the desired melting point depressant 100 includes at least one of Hf and Zr with the remainder being Ni and Cr. In constructions with 1.0 percent or less Ti in the base material, the preferred composition includes Ti with the balance being Ni and Cr. When the quantity of Ti is between 1.0 percent and 3.5 percent in the base material, the desired composition includes at least one of Zr, and Ti with the balance being Ni and Cr. The quantity of Ti, Zr, or Hf are selected such that the completed nickel-based component has less than 6.0 percent Ti (with other constructions being below 5.0 percent and still others below 4.0 percent).

Once the infiltration is complete, any features added for manufacturing requirements such as the gate 80 or a support structure illustrated in FIGS. 9-12 are removed to complete the component 60, 65. Any additional grinding, polishing, or layer additions can now be performed prior to the installation of the component 60, 65 as illustrated in FIG. 4. In preferred constructions, following infiltration, the component 60, 65 has less than one percent porosity.

The process described herein does not melt the base material powder 66. Rather, the powder 66 is mixed with the binder 67, 3D printed using a laser source or other energy source and dried. The binder 67 is burned out at low temperature (e.g., <500 C). The remaining base material 66 is heated up to a sintering temperature that assures a maximum of twenty percent porosity is left in the sintered material.

For nickel-based alloys, the amount of titanium employed is preferably limited to around six percent (i.e., between four and eight percent) to reduce the likelihood of reduced mechanical properties. Due to this limitation, the level of porosity in the skeleton 85, 90 is determined, at least in part by the amount of titanium in the base material and in the braze material 100 (sometimes referred to as melting point depressant) with the goal being about six percent titanium in the finished component 60, 65. For example, in one construction, the base material or the skeleton 85, 90 may include no titanium. If a braze material that contains 22% titanium is employed, the total porosity of the skeleton 85, 90 would be limited to about 30% which leads to a completed component 60, 65 with about 6.6% titanium.

In another example, the skeleton 85, 90 includes 1% titanium. In this case, using the same braze material with 22% titanium, the skeleton 85, 90 should be limited to less than 20% porosity to arrive at a finished component 60, 65 having about 5.2% titanium.

In yet another example, the skeleton 85, 90 includes 2% titanium. In this case, using the same braze material with 22% titanium the skeleton 85, 90 should be limited to less than 15% porosity to arrive at a finished component 60, 65 having about 6.0% titanium.

As discussed, nickel-based gas turbine components, specifically Alloy (CM) 247 components, are difficult to repair or build-up with any method that involves melting of the component since the grain boundary melting (incipient melting) temperature is low with respect to the welding temperature such that the weld repair often generates cracks during the repair process.

As discussed with regard to FIGS. 2-12, one alternative to weld repair is to first build a replacement component 60, 65 (a pre-sintered preform (PSP)) for the damaged section of the vane 30 and then join this new replacement component 60, 65 to the component being repaired (e.g., vane 30) using a process that assures a maximum temperature that remains below the grain boundary melting temperature. To further improve this repair, one could replace the damaged section of the component being repaired with a replacement component 60, 65 that includes a functional material that provides a higher oxidation resistance than the base material of the component being repaired (e.g., vane 30).

The damaged portion 55 is removed and replaced with a close-fitting replacement component 105 made using additively manufactured (AM) material or a pre-sintered preform (PSP) that provides similar or better oxidation and rupture properties. When the replacement component 105 is a replacement for the leading edge 35 as illustrated in FIGS. 2-4 and 9-12, additively manufactured replacement components 105 can include columnar grains with significant rupture capability.

To perform a repair of the leading edge 35 with a high oxidation resistant material, the damaged portion 55 of the leading edge 35 of the vane 30 is first removed. The removed damaged portion 55 is measured to determine the size and configuration of the replacement component 105 that will be installed. The replacement component 105 is then manufactured using an additive manufacturing process or as a PSP, such as a PSP made using a process as described with regard to FIGS. 2-12. To enhance the oxidation resistance of the replacement component 105, the material used to manufacture it, when using an additive manufacturing process includes up to eight percent (8%) aluminum. In addition, attachment structures 110 such as pins, protrusions, notches, apertures, etc. can be formed as part of the replacement component 105 to enhance or create an interlock between the replacement component 105 and the vane 30 or other component being repaired.

When the replacement component 105 is manufactured as a PSP the preferred material includes up to eighty percent (80%) superalloy (preferably matching the vane 30 being repaired), up to eight percent (8%) aluminum, and up to thirty percent (30%) braze material including Ti, Zr, and Hf as described above. As with the additively manufactured replacement component 105, the PSP replacement components 105 can include attachment structures 110 like those described above. FIGS. 9 and 10 illustrate attachment structures 110 in the form of alignment pins 111. The pins 111 align with and engage apertures formed in the blade 30 to which the replacement component 105 will attach. While the pins 111 are illustrated in only FIGS. 9 and 10 for clarity, in preferred constructions the pins 111 would be formed as part of the replacement component 105 and would therefore be present at each step of the manufacturing process. In other constructions, the pins 111 are separate components that are attached to the replacement component 105 at some point during its manufacture. Attachment could be facilitated using any suitable attachment means including but not limited to adhesives, welding, brazing, etc.

The material used to manufacture the PSP replacement component 105 is maintained at a temperature at least 50 degrees C. above the braze melting temperature for more than one hour to react a majority of the braze material with the base material powder. This prevents re-melting during the braze operation that attaches the replacement component 105 to the vane 30.

Figure 13:
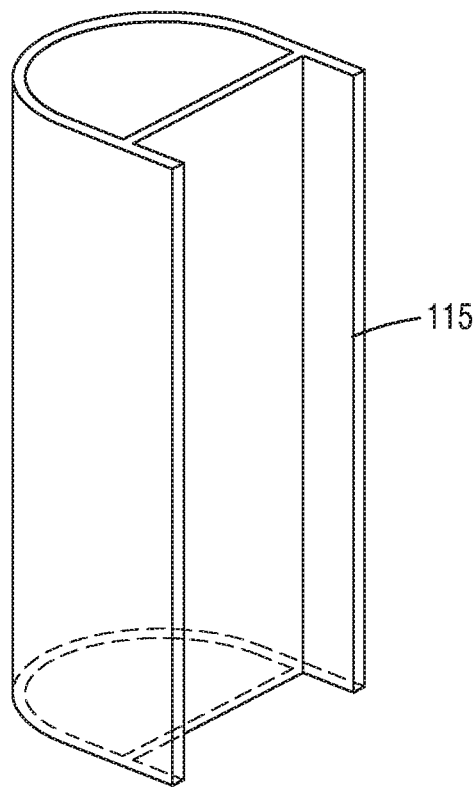
FIG. 13 is a perspective view of an attachment PSP for use in a leading-edge repair process.
Figure 14:
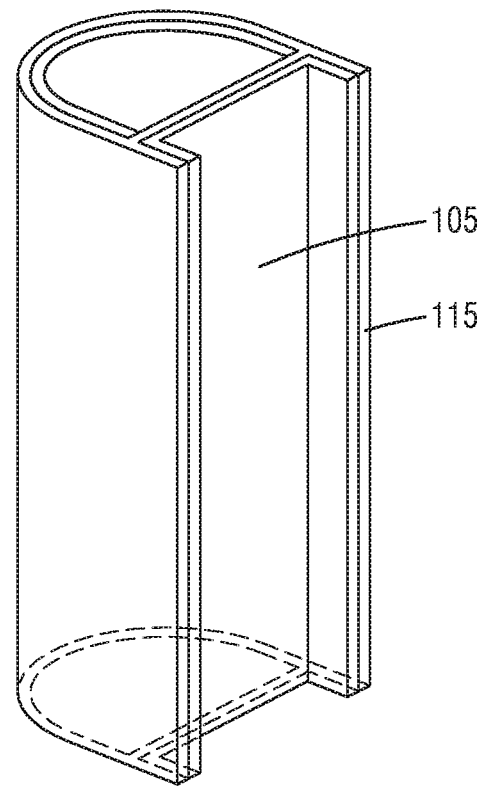
FIG. 14 is a perspective view of a leading-edge replacement component attached to the attachment PSP of FIG. 13.

An attachment PSP 115, shown in FIG. 13 is formed from a material combination similar to that described above with regard to the PSP replacement component 105 with the exception that it includes at least thirty percent (30%) braze material rather than up to thirty percent (30%) braze material. The attachment PSP 115 is preferably no more than 250 microns thick and is produced at a similar temperature as the PSP replacement component 105 described above but is held at that temperature for a shorter time (less than 15 minutes). The attachment PSP 115, therefore has enough unreacted braze material to be able to join the replacement component 105 as illustrated in FIG. 14, regardless of how it is manufactured (PSP or additive manufacturing) to the vane 30 being repaired.

The replacement component 105 has sufficient mechanical properties and oxidation resistance due to the adjusted composition and the Ni—Cr— (Ti, Zr, Hf) braze composition. In addition, when using the additively manufactured replacement component 105, the columnar grains provide significant rupture capability over the base material of equiaxed grain structure.

As will be described below, these processes and procedures can be applied to other components such as a tip 120 of the vane 30 or blade.

For example, FIGS. 15-19 illustrate a process similar to that just described but for the repair of the tip 120 of a nickel-based gas turbine vane 30 or blade, and specifically a vane 30 or blade made from Alloy 247 or a similar material.

Figure 15:
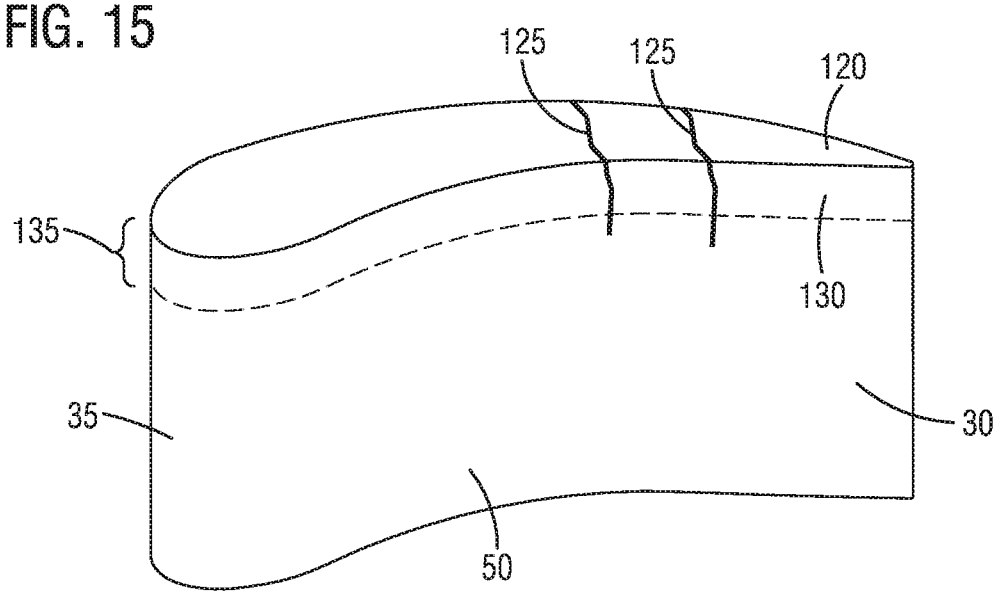
FIG. 15 is a perspective view of a portion of a gas turbine blade having operating damage in the form of tip corrosion and tip cracking.
Figure 16:
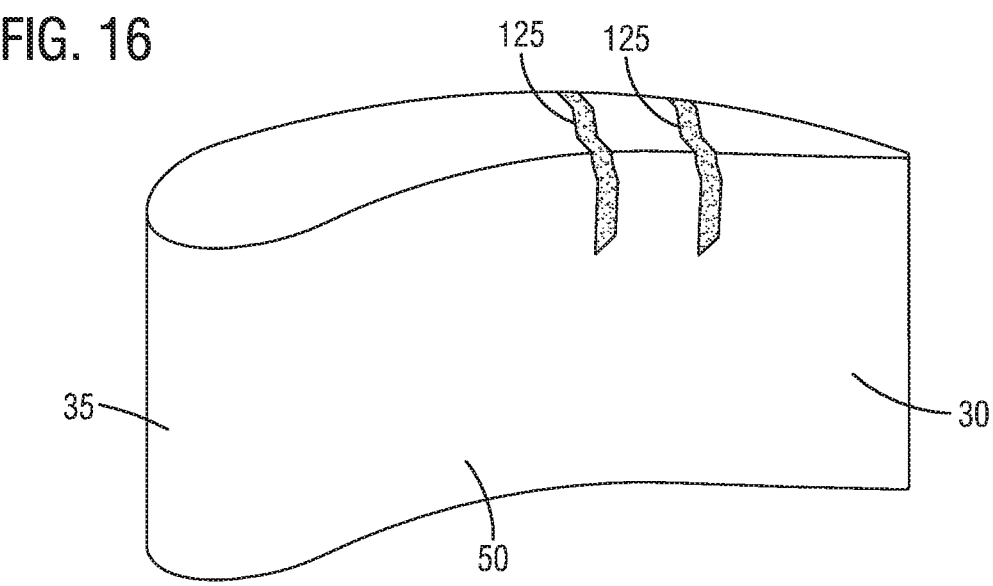
FIG. 16 is a perspective view of the blade of FIG. 15 with the damaged portion of the blade removed.

FIG. 15 schematically illustrates the blade 30 with tip section cracks 125 that extend downward in the blade 30. The blade tip 120 also includes oxidation damaged portions 130 that can be common following operation of the turbine blade 30. In order to repair the blade 30, the damaged portion of the tip 120 is first removed. In the example of FIG. 15, the removal of the damaged portion 135 does not completely remove the cracks 125 but does remove the oxidation damaged portions 130. It is desirable to minimize the amount of the tip 120 being removed such that in some circumstances, portions of the crack or cracks 125 may remain after removal. With reference to FIG. 16, any cracks 125 that remain after the removal of the damaged portion 135 are removed using a machining process, grinding, or other suitable material removal processes.

A closely fitting replacement tip 140 is formed to fill the space created by the removal of the damaged portion 135. The replacement tip 140 may also fill any spaces created during the removal of any cracks 125. Alternatively, the space opened during the removal of the cracks 125 can be filled with a powdered braze material during the attachment process for the replacement tip 140. The replacement tip 140 can be formed using an additive manufacturing (AM) process or can be formed from a pre-sintered preform (PSP) that provides similar or better oxidation and rupture properties than the removed portion 135.

Figure 17:
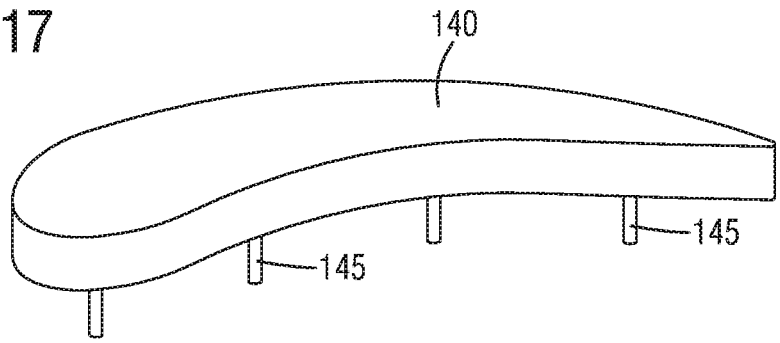
FIG. 17 is a perspective view of a replacement tip for the repair of the damaged blade of FIG. 16.

The replacement tip 140, when manufactured using an AM process is preferably composed of a material similar to the base material of the blade 30 with the addition of up to eight percent (8%) aluminum to provide superior oxidation resistance. In addition, attachment structures 110 such as pins 145, illustrated in FIG. 17, can be used to enhance the mechanical connection between the replacement tip 140 and the remainder of the blade 30 being repaired. Of course, other features such as protrusions, apertures, bosses, etc. can be used as attachment structures 110. The pins 145 of FIG. 17 are received in corresponding apertures formed or otherwise existing in the remaining portion of the blade 30 being repaired.

In constructions in which a PSP is used in place of an AM replacement tip 140, the material is preferably made of up to eighty percent (80%) superalloy (matching the base material of the blade 30 being repaired), up to eight percent (8%)

aluminum, and up to thirty percent (30%) braze material including Ti, Zr, and Hf as described above.

The material used to manufacture the PSP replacement tip 140 is maintained at a temperature at least 50 degrees C. above the melting temperature of the braze material for more than one hour to react a majority of the braze material with the base material powder. This prevents re-melting during the braze operation that attaches the replacement tip 140 to the blade 30 being repaired.

Figure 18:
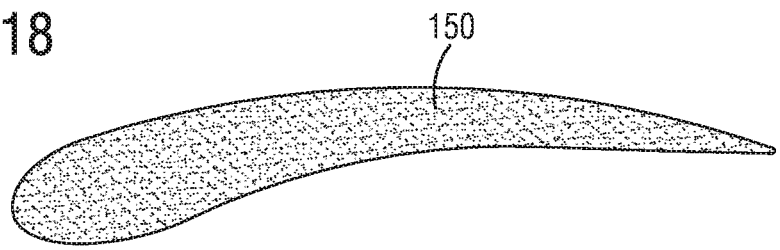
FIG. 18 is a perspective view of an attachment PSP for use in repairing the blade tip of FIG. 16.
Figure 19:
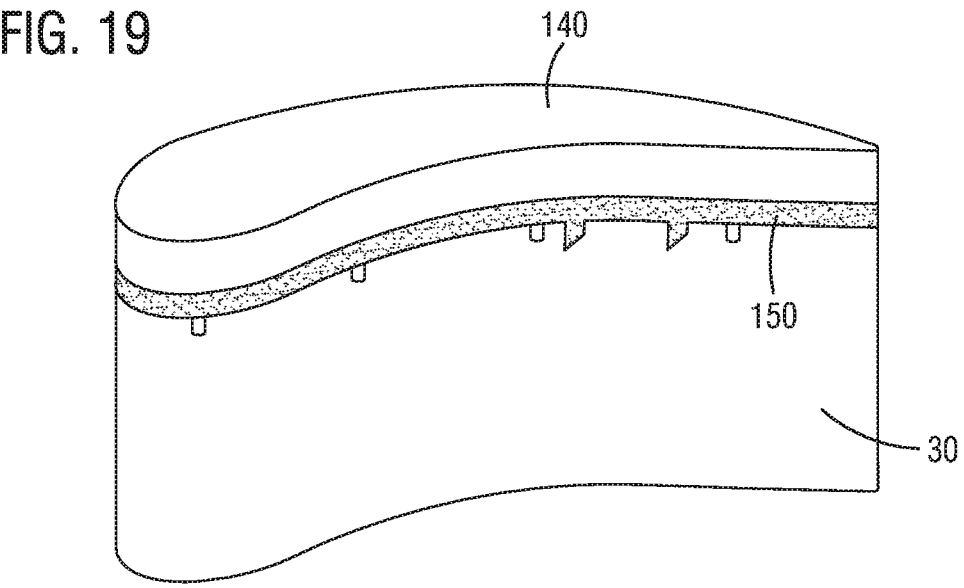
FIG. 19 is a perspective view of the damaged blade of FIG. 16, the attachment PSP of FIG. 18, and the replacement tip of FIG. 17.

A tip attachment PSP 150, shown in FIG. 18 is formed from a material combination similar to that described above with regard to the PSP replacement tip 140 with the exception that it includes at least thirty percent (30%) braze material rather than up to thirty percent (30%) braze material. The tip attachment PSP 150 is preferably no more than 250 microns thick and is produced at a similar temperature as the PSP replacement tip 140 described above but is held at temperature for a shorter period of time (less than 15 minutes). The tip attachment PSP 150 therefore has enough unreacted braze material to be able to join the replacement tip 140 to the blade 30 being repaired as illustrated in FIG. 19, regardless of how the replacement tip 140 is manufactured (PSP or additive manufacturing).

The replacement tip 140 has sufficient mechanical properties and oxidation resistance due to the adjusted composition and the Ni—Cr— (Ti, Zr, Hf) braze composition.

As discussed earlier, gas turbine components operate under a variety of localized conditions that can produce localized damage. This can be attributed to varied component conditions (e.g., temperatures, pressures, fluid properties, etc.) and engine conditions.

Figure 22:
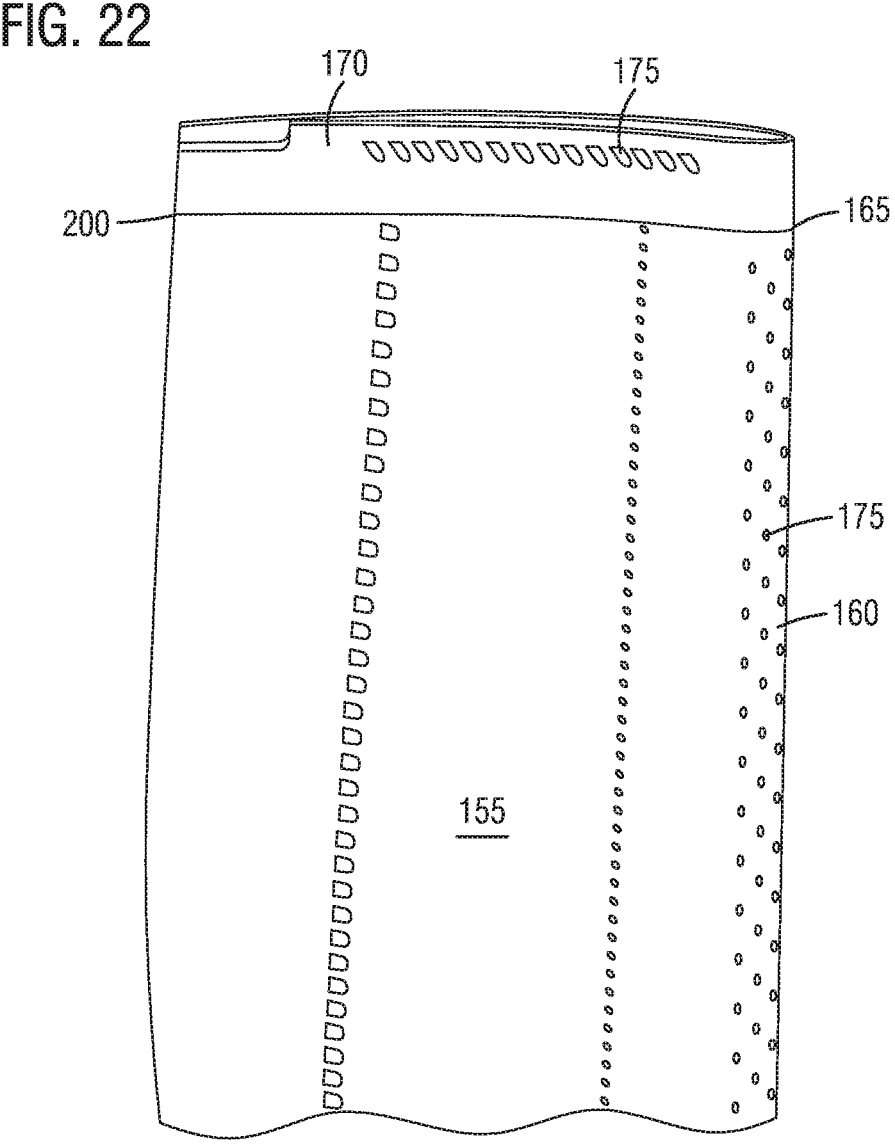
FIG. 22 is a perspective view of the replacement tip of FIG. 21 installed onto the blade of FIG. 16.

One example of localized operating conditions exists at the row one turbine blade 155 where localized distress on the blades 155 can cause damage in multiple areas including a leading edge 160 of the blade 155 and a tip 165 of the blade 155. FIG. 22 illustrates the leading edge 160 and the tip 165 of the blade 155 and also illustrates a replacement tip 170 installed to repair cracking and/or oxidation damage at the blade tip 165.

One type of damage occurs at the leading edge 160 of the first stage blade 155, as well as other blades where the ceramic coating adheres adjacent a series of cooling apertures 175. If the coating spalls, a leading edge burn out or loss is often observed. The other area where damage can occur is at the tip 165 of the blade 155 where the blade 155 can rub against a ring segment or other component radially outward of the blade 155. Heavy oxidation can also occur at the tip 165 of the blade 155 and cracks or tip cracks can form and propagate from cooling apertures 175 or from damage caused by other factors such as rubbing or oxidation.

As discussed previously, repairs to blade or vane tips 165 can include the removal of a portion of the blade tip 165 followed by replacement with a replacement tip 170. Similar repairs can also be made to blade or vane leading edges 160.

Additive manufacturing can be relied upon to manufacture replacement components or replacement tips 170 with brazing processes and special braze materials enhancing the operation of the repaired vane or blade 155.

Figure 20:
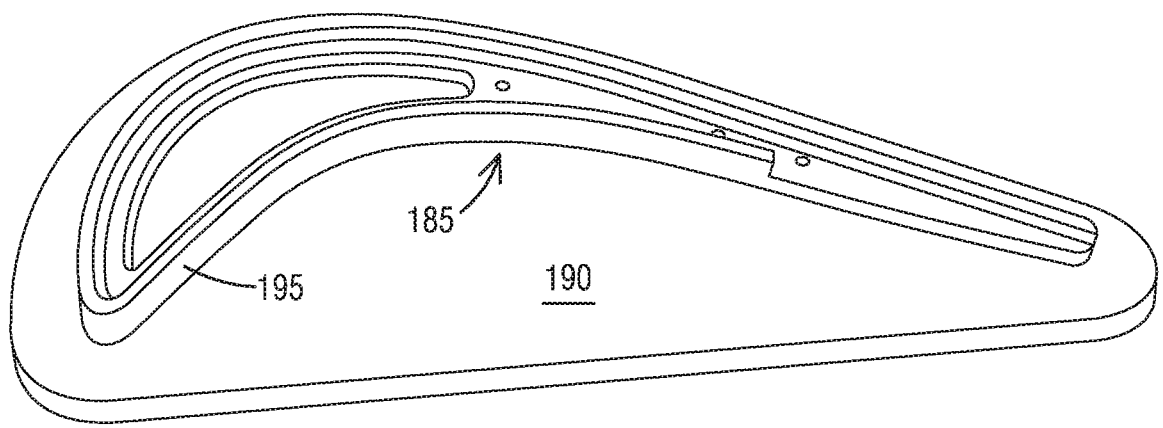
FIG. 20 is a perspective view of replacement tip in a "green-form" during the manufacturing process.
Figure 21:
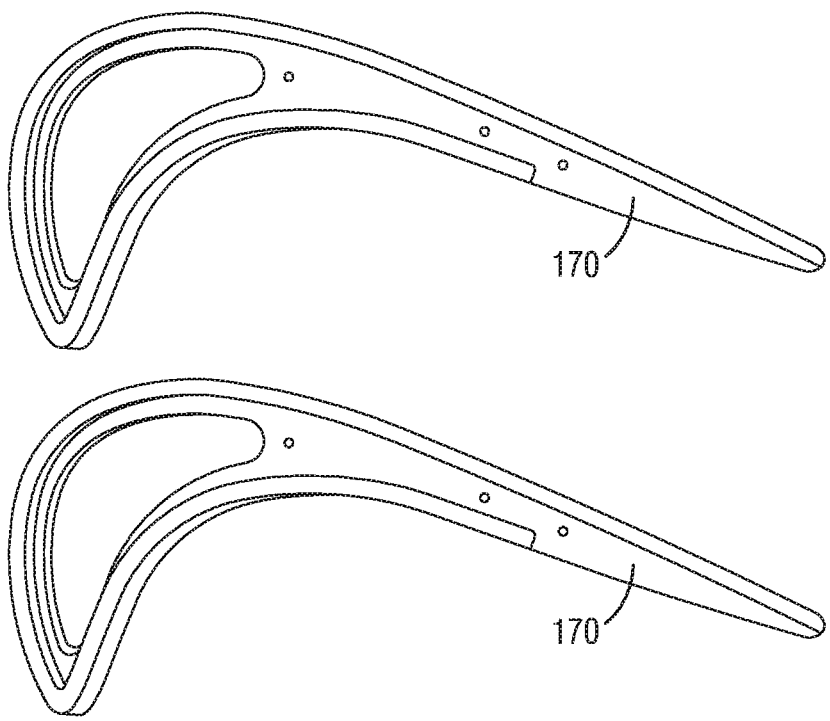
FIG. 21 is a perspective view of the replacement tip of FIG. 20 after sintering and removal from the manufacturing support member.

One preferred additive manufacturing process well-suited to manufacturing replacement components or replacement tips 170 includes atomic diffusion. FIGS. 20-22 illustrate the process of repairing the blade tip 165 using atomic diffusion to form the replacement tip 170. As one of ordinary skill will realize, the same process could be applied to the repair of the leading edge 160 of the blade 155 or vane as well as to other components not discussed herein.

With reference to FIG. 20, atomic diffusion uses binding agents and a metal powder for rapid construction of a 3D shape. The metal power is generally selected to closely match the material (e.g., Alloy (CM) 247) used in the component (i.e., the blade 155) being repaired. The metal powder and the polymeric binding agent are mixed and then formed into the desired shape that will ultimately result in the replacement component or tip 170. This preliminary component 185 is often referred to as a "green-form". The "green-form" component 185 is then heated and sintered in a high temperature sintering operation to remove the binding agent and mechanically/metallurgically bond the powder particles. The sintering temperature is selected to fully remove the binding agent while providing the desired mechanical/metallurgical bond of the powdered metal without fully melting the powdered metal particles.

One method of forming the green-form component 185 includes a 3-D printing technique. A wire feedstock is prepared including the desired powder metal and the binder. The user is able to combine material chemistries or tailor chemistries as desired to achieve the desired material properties in the completed replacement tip 170 or replacement piece. In addition, different compositions can be used at different times during the forming of the replacement tip 170 to achieve different properties at the different locations within the replacement tip 170. For example, in one construction a composition intended to be a first or interfacing layer includes the desired base materials as well as braze material integrated into the wire feedstock.

To manufacture the replacement tip 170 or another component, the first or interfacing layer is deposited onto a support structure 190 or is formed independent of the support structure 190. The first surface in the example of FIG. 20 is intended to be the surface that interfaces or is brazed to the component being repaired (i.e., the blade 155) to attach the replacement tip 170 to the blade 155 being repaired. Additional layers may be formed on top of the first layer using the same material, or another material may be used as may be required for the particular replacement component.

For example, the feedstock could be changed to a second material that does not include the braze material and rather, more closely matches the base material of the blade 155 or other component being repaired. As discussed above, some materials could be employed that enhance the performance of the replacement tip 170 or other component over that of the base material. Any of those materials could be employed in this process as well. For example, up to 8% aluminum could be employed to enhance oxidation resistance. As previously noted, the sintering process is designed to not melt the powdered material. Because the process is a non-melting process, no variation in chemistry is expected.

With continued reference to FIG. 20, the metal powder is extruded with the binder (e.g., a polymer) to create the wire feedstock that is then deposited onto the support structure 190. A ceramic interlayer 195 may be positioned between the deposited material and the support structure 190 to aid in the removal of the completed replacement tip 170 from the support structure 190. A washing step of the green structure removes the polymer binder and densification is performed via sintering. Typically, densities of greater than ninety-six percent can be achieved but this is dependent on component size and corresponding wall thickness, since the densification is achieved by solid stage diffusion. Examples of replacement tips 170 formed using this process, after sintering and removed from the support structure are illustrated in FIG. 21.

This method does not experience the isotropy of layer-based AM techniques and because of its speed in producing the green-form component 185 and very low powder waste, reduces cost significantly over other AM techniques. In addition, as noted earlier this process of additive manufacturing can be used to form components other than replacement tips 170, including leading edge replacements or other components and can include advanced features such as attachment structures 110.

Another benefit with this approach is that the components can be made from other high temperature resistant materials (e.g., oxide dispersion strengthened (ODS) or advanced single crystal (CMSX8/Rene N5/PWA1484)) that have better strength, oxidation resistance, and coating adhesion.

In summary, FIGS. 20-22 illustrate a replacement tip 170 during various states of manufacture using the atomic diffusion process. After removal of the damaged portion of the tip 165 of the blade 155 being repaired, the replacement tip 170 can be sized for manufacture. In many cases, the support structure 190 will be needed to define a base of support onto which the replacement tip 170 can be formed. While not required, in situations where the support structure 190 is used, a ceramic interlayer 195 may be first applied to aid in easily separating the completed replacement tip 170 from the support structure 190.

The green-form component 185 is next printed using feedstock of the appropriate makeup. The first layer, or the first few layers may use a feedstock that is part base material, part binder, and part braze material that ultimately is used during the attachment of the replacement tip 170 to the blade 155. After these initial layers are printed, the feedstock may be switched to a feedstock that includes the desired base metal chemistry (i.e., a chemistry closely matching the blade 155) and a binder, often in the form of a polymer. The chemistry of the subsequent feedstock may include an enhanced chemical make-up as discussed earlier to provide superior material properties such as oxidation resistance.

Upon completion of the 3-D printing process, the green-form component 185 is washed and sintered to remove the binder and to mechanically or metallurgically bond the remaining particles in the desired shape. The sintered replacement tip 170 is removed from the support structure 190 as illustrated in FIG. 21.

As illustrated in FIG. 22, the replacement tip 170 is placed in position on the blade 155 and a braze joint 200 is formed therebetween. During the brazing process, braze material in the initial layer or layers of the replacement tip 170 facilitates the completion of the braze joint and the attachment of the replacement tip 170.

Current materials used for pre-sintered preforms (PSPs) and for brazing materials for use with nickel-based super alloy materials that operate in high temperature environments (e.g., 1000 degrees F., 538 degrees C.) are typically nickel (Ni) chromium (Cr) based.

The composition described herein is preferably applied to PSPs and/or braze materials that do not include boron. To improve the creep rupture life of boron-free PSPs and braze materials, rhenium (Re) or Ruthium (Ru) can be added to most nickel-based braze alloys. These two elements are potent creep resistance elevators that are added to base metal composition for creep-rupture life improvement. They increase the creep resistance of nickel-base alloys by up to a factor of ten. Their high melting point and large atomic diameter results in low atomic diffusion rates and enables Ni base materials to increase their creep resistance.

Rhenium (Re) and Ruthium (Ru) have not been added to boron-free braze materials to date as the need for creep resistance braze materials was not known.

To add Re or Ru, the materials are powdered and then mixed with a base material powder mixture prior to brazing. Re and Ru are added to boron free Ni—Cr—X braze/base material powder mixture prior to PSP making. Preferably, the Re and Ru have the smallest particle size possible for the powder. It is preferred that Re and Ru powder diameter is at least 50% or smaller than the base metal and braze metal powder to assure uniform mixing and homogeneous elemental distribution after brazing. Re and Ru powders are not melted during the brazing process. Rather they diffuse into the surrounding liquid braze material during braze. Since diffusion rates are high in liquid, these elements are transported uniformly within the braze material.

Re and Ru are added such that they make up 3-6 percent of the total composition of the braze or PSP regardless of the proportion of base metal to braze powder in the braze.

For example, the repair of a component manufactured from Alloy 247 may employ a PSP that is manufactured from powders in which 74-77 percent matches the Alloy 247 composition, 20 percent matches a desired braze material (sometimes referred to as a melting point depressant), and 3-6 percent is one or both of Re or Ru.

Suitable braze materials are typically nickel-based and include nickel, chromium, and at least one of titanium, zirconium, and hafnium. Some specific braze compositions include a composition that includes 6.5% Cr, 11% Zr, 7.5% Ti, and the remainder Ni. Another composition could include 5.0% Cr, 10% Hf, 10% Zr, and the remainder Ni. Yet another composition could include 17% Cr, 22% Ti, and the remainder Ni.

Each of the three components, the base material (74-77 percent), the braze material (20 percent), and the Re or Ru (3-6 percent) are powdered and mixed together for sintering. During any melting steps (i.e. brazing processes), the Re and Ru are not melted. Rather, they disperse through any melt pools during the melting process.

FIG. 3 illustrates one possible PSP insert 60 that could be manufactured using the above-described materials. The PSP insert 60 is preformed and sintered to include base material, a braze material, and the desired quantity of Re or Ru. FIG. 4 illustrates the repair of a turbine vane 30 using the PSP insert 60 illustrated in FIG. 3. After the damaged portion of the vane 30 is removed, the required PSP insert 60 is sized and manufactured as described. The PSP insert 60 is then positioned in the empty space 55 in the vane 30 and brazed into place. During the brazing process, some of the Re and Ru will migrate into the liquid braze. The Re and Ru will not melt in the pool but rather will become embedded in the braze material during solidification.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A blade for a gas turbine, the blade including a removed portion space, the blade comprising:
   an airfoil portion defining the removed portion space, the airfoil portion formed from a base material;
   a replacement component filling the removed portion space, the replacement component formed from a material that includes:
   50%-80% base material;
   0%-30% braze material; and
   0%-8% aluminum; and
   a braze joint including an attachment component formed between the airfoil portion and the replacement component to attach the replacement component to the airfoil portion and fill the removed portion space,
   wherein a braze material of the attachment component does not contain boron.

2. The blade of claim 1, wherein the attachment component is an attachment pre-sintered preform (PSP) positioned between the replacement component and the airfoil portion, the braze joint formed between the airfoil portion and the attachment PSP.

3. The blade of claim 2, wherein the attachment PSP is formed from a material that includes:

50%-70% base material;
30%-50% braze material; and
0%-8% aluminum.

4. The blade of claim 1, wherein the braze material of the attachment component is a Ni—Cr braze material that includes at least one of Ti, Zr, and Hf.

5. The blade of claim 4, wherein the braze material of the attachment component further comprises between 3% and 6% Re or Ru, individually or in combination.

6. The blade of claim 1, wherein the removed portion space includes a portion of a leading edge of the blade, and wherein the replacement component is a leading-edge replacement component.

7. The blade of claim 1, wherein the removed portion space includes a tip of the airfoil portion, and wherein the replacement component is a tip replacement component.

8. The blade of claim 1, further comprising a plurality of pins extending from the replacement component and arranged to engage the airfoil portion.

9. The blade of claim 1, wherein the base material is a nickel-based superalloy having a chemical composition that falls within the specifications of Alloy 247.

* * * * *